United States Patent [19]

Haage et al.

[11] Patent Number: 5,569,091
[45] Date of Patent: Oct. 29, 1996

[54] EXPANSIBLE METAL ANCHOR AND METHOD OF MANUFACTURING IT

[75] Inventors: Manfred Haage, Dornstetten; Guenter Seibold, Pfalzgrafenweiler; Bernd Plocher, Rottenburg; Bernd Hein, Freudenstadt; Wilfried Weber, Schopfloch, all of Germany

[73] Assignee: fischerwerke, Artur Fischer GmbH & Co KG, Waldachtal, Germany

[21] Appl. No.: 375,649

[22] Filed: Jan. 20, 1995

[30]     Foreign Application Priority Data

Jan. 28, 1994 [DE] Germany .................. 44 02 478.9

[51] Int. Cl.⁶ .................. B23G 9/00; F16B 13/04
[52] U.S. Cl. .................. 470/12; 411/40; 411/57
[58] Field of Search .................. 470/8, 11, 12, 470/16, 17; 411/32, 33, 39, 40, 51, 52, 57, 63

[56]         References Cited

U.S. PATENT DOCUMENTS

| 3,750,526 | 8/1973 | Lerich | 411/61 |
|---|---|---|---|
| 4,011,786 | 3/1977 | Liebig | 411/45 |
| 4,074,609 | 2/1978 | Busler | 411/57 |
| 5,419,664 | 5/1995 | Hengesbach et al. | 411/61 |

FOREIGN PATENT DOCUMENTS

| 2162981 | 6/1973 | Germany . |
|---|---|---|
| 2637350 | 12/1983 | Germany . |
| 3346537 | 7/1985 | Germany . |
| 3526784 | 1/1987 | Germany . |
| 3334754 | 8/1992 | Germany . |

*Primary Examiner*—Lowell A. Larson
*Assistant Examiner*—Thomas C. Schoeffler
*Attorney, Agent, or Firm*—Michael J. Striker

[57]         ABSTRACT

The expansible metal anchor (1) for anchoring in a hole drilled in a component includes a shank part (2) and an expander cone (4) having a polygonal cross-section defining several faces (13) at its front end. On each face (13) of the expander cone (4) an expansible segment (5) is arranged spaced from that face by a gap (7) corresponding approximately to the distance (8) by which the expansible segments (5) project radially from the shank part (2). Each expansible segment (5) is joined to the shank part (2) at its end face directed towards the shank part (2) by web members (6, 6') constituting predetermined break points. As the expansible anchor is driven into the hole drilled in the component, the web members (6,6') break off, so that the expansible segments (5) are displaceable on the faces (13) of the expander cone. The expansible anchor (1) is manufactured from powdered metal by an injection-molding process using a system of binders with subsequent removal of the binders and sintering, and a slide member of the mold divided at the corner edges (20) of the faces (13) is used to make the gap (7) between the expansible segments (5) and the faces (13) of the expander cone (4).

9 Claims, 1 Drawing Sheet

EXPANSIBLE METAL ANCHOR AND METHOD OF MANUFACTURING IT

BACKGROUND OF THE INVENTION

The present invention relates to an expansible anchor made of metal, and to a method for the manufacture thereof.

The expansible anchor comprises a shank part having means for holding or fixing an article at its rear end and an expander cone at its front end having expansible segments separated from each other by slots. The expander cone widens from a reduced cross-section towards the front end until it has a diameter approximately the same as the shank diameter.

German Published Patent Application DE-OS 35 26 784 A1 discloses an expansible metal anchor which has a shank part provided with an external thread and an expander cone. An expansible sleeve provided with a continuous longitudinal slot is pulled over the expander cone. The sleeve is resiliently deformable and has an external diameter larger than the diameter of the shank. As the expansible anchor is driven into the hole drilled in the anchoring substrate, the expansible sleeve is pressed together until of the diameter of the drilled hole. The expansible sleeve is consequently fixed in the drilled hole so that an axial displacement of the shank part draws the expander cone into the fixedly held expansible sleeve to expand the latter. Anchoring of the expansible anchor is therefore only possible if the shank part and the expansible sleeve are displaceable with respect to one another and at the same time the expansible sleeve is capable of being fixed in the drilled hole.

With the known metal expansible anchors, this is achieved when the expansible sleeve and the shank part are manufactured as separate parts and are joined together in an assembly operation. The shank part is normally manufactured by a turning method or as a cold extruded part, while the expansible sleeve is manufactured from sheet metal as a stamped and bent part. The respective manufacturing processes of the individual parts restrict firstly the potential configurations of the parts, and cause considerable time to be expended and considerable expense to be incurred in the manufacture and assembly of the expansible anchor.

SUMMARY OF THE INVENTION

It is an object of the present invention to provide an expansible metal anchor which can be manufactured simply and inexpensively without assembly being required.

According to the invention, the expansible metal anchor comprises a shank part having a shank diameter, a shank cross-section, a front end and a rear end; means for fixing an article at the rear end of the shank part; an expander cone at the front end of the shank part having an expander cone cross-section which decreases in a direction from the front end toward the rear end from approximately the shank cross-section to a reduced cross-section and which is approximately polygonal so that the expander cone has a plurality of faces; and a plurality of expansible segments at least partially separated from each other by slots, wherein each of the expansible segments are arranged on the shank part so that each expansible segment is spaced by a gap from one of the faces of the expander cone and the expansible segments project radially a distance from the shank part, the gap corresponds approximately to the distance, each of the expansible segments are joined by at least one web member at an end face thereof directed toward the rear end of the shank part, and the web members provide predetermined break points for separation of the expansible segments from the shank part.

Since the expander cone has a polygonal cross-section and polygonal faces, it can be constructed by slide members of the mold which are inserted between the expansible segments and the faces of the polygon. These mold slide members can be drawn out along the faces of the polygon after release from the mold. The gaps created between the faces of the expander cone and the inner walls of the expansible segment by the slide member of the mold are compensated for by the expansible segments projecting radially from the shank. As the expansible anchor is driven into the hole drilled in the anchoring substrate, the projecting expansible segments are pressed together until at the diameter of the drilled hole, so that their inner walls come to bear against the faces of the expander cone. At the same time, the web members connecting the expansible segments and the shank part shear off, so that the expansible segments rest freely in the drilled hole on the faces of the expander cone. The friction between the outer surface of the expansible segments and the wall of the drilled hole holds the expansible segments in place in the drilled hole, so that the expander cone formed by the faces of the polygon is drawn by the axial movement of the shank part into the expansible segments. The expansible segments are consequently pressed radially outwards and anchored in the drilled hole. Since each face of the polygon is assigned its own expansible segment separated from the other expansible segments and from the shank part, the radial force component arising from retraction of the expander cone is converted fully into expansion force. In this manner, a high holding force of the expansible anchor is achieved with little retraction force. The ease with which the expansible segments can be displaced on the faces of the polygon enables the expander cone to slide up subsequently when the drilled hole widens as a result of cracks forming. The expansible anchor according to the invention is therefore especially suitable for anchoring in the tensile zone in which cracks may form.

Instead of being plane faces, the faces of the expander cone can also be curved, with the same radius of curvature at every point. Even when the faces of the polygon are constructed in this manner, removal from the mold is possible by drawing out the slide member of the mold along the faces of the polygon.

To achieve a circumferentially uniform expansion, it is advisable to construct the expander cone so that it has four faces, i.e. so that its polygonal cross-section is rectangular.

Driving the expansible anchor into the drilled hole of the anchoring substrate with its expansible segments projecting can be facilitated by providing a ramp-like slope at the front ends of the expansible segments.

To increase the friction between the expansible segments and the wall of the drilled hole, it is useful to provide the outer faces of the expansible segments with a knurled roughened surface.

In order to prevent the expansible segments canting over as they are driven into the drilled hole, the expansible segments are advantageously joined to the shank part by two web members. In order on the one hand to save material and on the other hand to accommodate drilling dust left behind in the drilled hole, several longitudinally extending recesses can be arranged on the shank part distributed over the outer surface thereof, and a cavity can be arranged in the end face of the expander cone.

It is possible to manufacture the expansible anchor of metal simply and inexpensively using an injection-molding process known per se. According to that process, the expansible anchor is manufactured from powdered metal in an injection-molding operation in which a system of binders is used and the binders are subsequently removed and the expansible anchor is sintered. To create the gap between the expansible segments and the faces of the polygon of the expander cone, a mold slide member divided at the corner edges of the polygon is used, the individual parts of which mold slide member are drawn out along the faces of the polygonal cross-sectioned expander cone.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENT

Figure 1:
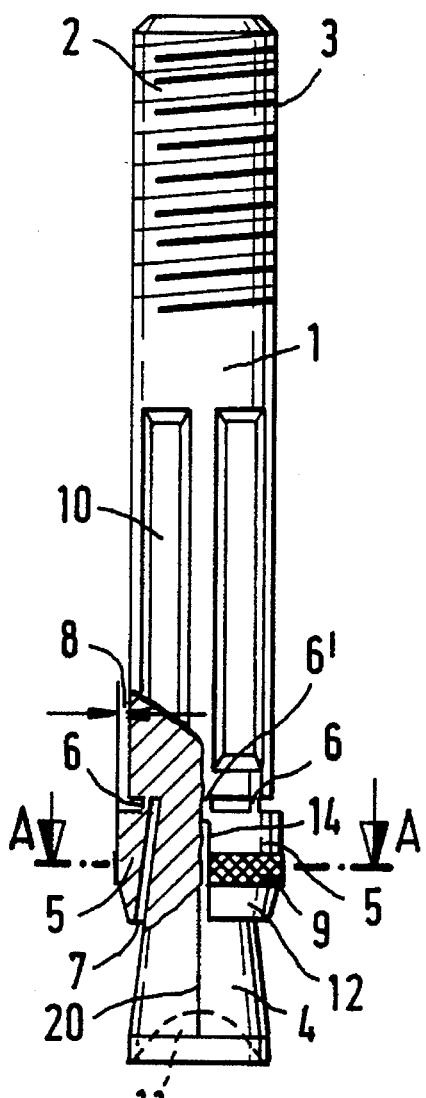
FIG. 1 is a partially cutaway cross-sectional, partially side view of a metal expansible anchor manufactured by powder injection-molding according to the invention.

The expansible metal anchor 1 illustrated in FIG. 1 consists of the shank portion 2, at the rear end of which there is an external thread 3 and at the front end of which there is an expander cone 4. From FIG. 2 it is clear that the expander cone 4 has a polygonal cross-section, in the illustrated embodiment a rectangle. Each face 13 of the polygonal cross-sectioned expander cone 4 is associated with an expansible segment 5, which is joined to the shank part 2 by web members 6,6'. Each expansible segment 5 is preferably attached by two web members 6,6' to the shank part 2, one web member 6' preferably being arranged between two expansible segments 5 so that two adjacent expansible segments 5 are held by this web member 6'. The inner faces of the expansible segments 5 together with the faces 13 of the polygonal cross-sectioned expander cone 4 form and bound a gap 7, the width of which corresponds approximately to the distance 8 by which the expansible segments 5 project radially with respect to the diameter of the shank.

To increase the friction of the expansible segments 5 with the wall of the drilled hole, the expansible segments have a knurled roughened surface 9 on their outer faces. To save material, on the one hand, and to accommodate drilling dust, on the other hand, the outer face of the shank part 2 is provided with longitudinally extending recesses 10 and the end face of the expander cone 4 is provided with a cavity 11. To introduce the expansible anchor more easily into the hole drilled in a component, the expansible segments 5 have a ramp-like sloping surface 12 at their front ends.

Figure 2:
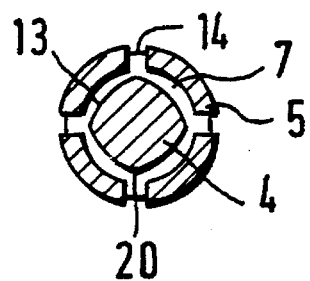
FIG. 2 is a transverse cross-sectional view through the expander cone of the metal expansible anchor shown in FIG. 1 taken along the section line A—A of FIG. 1.

The cross-section of the expander cone 4 illustrated in FIG. 2 shows that the cross-section is substantially rectangular, although the faces 13 of the polygonal cross-sectioned expander cone 4 are curved. To allow removal from a mold used in its manufacture, the radius of curvature of faces 13 is the same at every point over the entire length of the expander cone 4. The expansible segments 5 are separated from one another at their longitudinal edges by respective slots 14.

The expansible anchor 1 is manufactured by a powder injection molding operation using an injection molding tool. The inner faces of the expansible segments 5 and the faces 13 of the polygonal cross-sectioned expander cone 4 are created by a slide member of the mold which is divided at the corner edges 20 of the polygon into individual slide elements. The thickness of the individual slide elements corresponds to the gap 7 between the expansible segments 5 and the faces 13 of the polygon.

Figure 3:
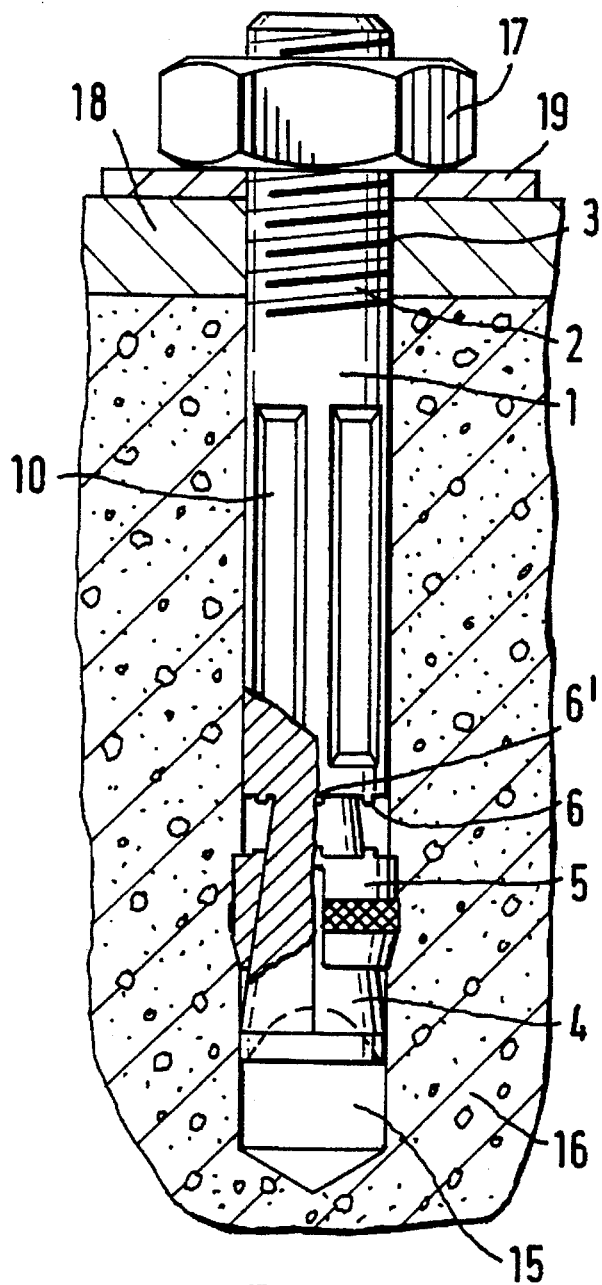
FIG. 3 is a partially cutaway cross-sectional, partially side view of the metal expansible anchor of FIG. 1 in operation anchored in a component.

In the diagram shown in FIG. 3, the expansible anchor 1 is anchored in the hole 15 drilled in the component 16. As the expansible anchor 1 is inserted in the drilled hole 15, the radially projecting expansible segments 5 are pressed together until of the diameter of the drilled hole 15, so that the expansible segments 5 are positioned on the faces 13 of the polygonal cross-sectioned expander cone 4. As the expansible segments are pressed together, the joining web members 6, 6' shear off, so that the expansible segments 5 rest on the faces 13 of the polygonal cross-sectioned expander cone 4 so that they can be axially displaced. By screwing the nut 17 onto the external thread 3 of the shank part 2, the shank part 2 is displaced towards the mouth of the drilled hole, so that the expander cone 4 is drawn into the expansible segments 5 fixedly held by the wall of the drilled hole. The expansible segments 5 are pressed radially outwards by the faces 13 of the polygonal cross-sectioned expander cone 4, which rise with respect to the bottom of the drilled hole, and the expansible anchor 1 is anchored in the drilled hole 15. At the same time, the article 18 to be fixed is clamped to the component 16 by a washer 19.

It will be understood that each of the elements described above, or two or more together, may also find a useful application in other types of constructions differing from the types described above.

While the invention has been illustrated and described as embodied in an expansible metal anchor, and to a method for the manufacture it, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. An expansible metal anchor comprising a shank part (2) having a shank diameter, a shank cross-section, a front end and a rear end;

means (3,17) for fixing an article (18) at said rear end of said shank part (2);

an expander cone (4) at the front end of said shank part (2) and having an expander cone cross-section, wherein said expander cone cross-section decreases in a direction from the front end toward the rear end from approximately said shank cross-section to a reduced cross-section less than the shank cross-section and said expander cone cross-section is approximately polygonal so that said expander cone (4) has a plurality of faces (13); and a plurality of expansible segments (5) at least partially separated from each other by slots (14), wherein said expansible segments (5) are arranged on said shank part (2) so that each of said expansible segments (5) is spaced by a gap (7) from one of the faces (13) of the expander cone (4) and projects radially a distance (8) from said shank part (2), said gap (7) corresponds approximately to said distance (8), each of said expansible segments (5) is joined to the shank part (2) by at least one web member (6,6') at an end face thereof, said end face facing in a direction toward the rear end of the shank part (2), and said web members (6,6') provide predetermined break points for separation of said expansible segments (5) from said shank part (2).

2. An expansible anchor as defined in claim 1, wherein the faces (13) of the expander cone (4) are curved and have a curvature radius which is the same at each point on said faces (13).

3. An expansible anchor as defined in claim 1, wherein said expander cone cross-section is substantially rectangular so that said expander cone (4) has four of said faces (13).

4. An expansible anchor as defined in claim 1, wherein each of the expansible segments (5) have a ramp-like sloping surface (12) at a front end thereof.

5. An expansible anchor as defined in claim 1, wherein the expansible segments (5) each have an outer face and each of said outer faces has a knurled roughened surface (9).

6. An expansible anchor as defined in claim 1, wherein said at least one web member (6,6') joining each of said expansible segments (5) to said shank part (2) consists of two of said web members.

7. An expansible anchor as defined in claim 1, wherein the shank part (2) has an external thread (3) in the vicinity of said rear end and between the expander cone (4) and the external thread (3) said shank part (2) is provided with a plurality of longitudinally extending recesses (10) distributed over an outer surface thereof.

8. An expansible anchor as defined in claim 1, wherein said expander cone (4) has an end face and a cavity (11) is provided in the end face of the expander cone (4).

9. A method of manufacturing an expansible metal anchor comprising a shank part (2) having a shank diameter, a shank cross-section, a front end and a rear end;

means (3,17) for fixing an article (18) at said rear end of said shank part (2);

an expander cone (4) at the front end of said shank part (2) and having an expander cone cross-section, wherein said expander cone cross-section decreases in a direction from the front end toward the rear end from approximately said shank cross-section to a reduced cross-section less than the shank cross-section and said expander cone cross-section is approximately polygonal so that said expander cone (4) has a plurality of faces (13); and a plurality of expansible segments (5) at least partially separated from each other by slots (14), wherein each of said expansible segments (5) are arranged on said shank part (2) so that each of said expansible segments (5) is spaced by a gap (7) from one of the faces (13) of the expander cone (4) and said expansible segments (5) project radially a distance (8) from said shank part (2), said gap (7) corresponds approximately to said distance (8), each of said expansible segments (5) are joined by at least one web member (6,6') at an end face thereof facing the shank part (2), and said web members (6,6') provide predetermined break points for separation of said expansible segments from said shank part (2), said method comprising the steps of:

a) injection molding the shank part (2) with the expander cone (4) and the expansible segments (5) from powdered metal using a system of binders;

b) subsequently removing said binders and sintering; and c) forming the gap (7) between the expansible segments (5) and the faces (13) of the expander cone (4) with a slide member of a mold divided at corner edges (20) of the faces (13) of the expansible segments (5).

* * * * *